No. 677,804. Patented July 2, 1901.
J. SCHULTE, Jr.
BICYCLE BRAKE AND SUPPORT.
(Application filed Oct. 18, 1900.)
(No Model.)

Witnesses,

Inventor,
Joseph Schulte jr
By Dewey Strong & Co.
Attys

UNITED STATES PATENT OFFICE.

JOSEPH SCHULTE, JR., OF MONTEREY, CALIFORNIA, ASSIGNOR OF ONE-HALF TO HENRY J. HENNEKER, OF SAME PLACE.

BICYCLE BRAKE AND SUPPORT.

SPECIFICATION forming part of Letters Patent No. 677,804, dated July 2, 1901.

Application filed October 18, 1900. Serial No. 33,441. (No model.)

*To all whom it may concern:*

Be it known that I, JOSEPH SCHULTE, Jr., a citizen of the United States, residing at Monterey, county of Monterey, State of California, have invented an Improvement in Bicycle Brakes and Supports; and I hereby declare the following to be a full, clear, and exact description of the same.

My invention relates to an attachment for bicycles which serves the double purpose of a brake and as a support to retain the bicycle in an upright position when it is to be left alone.

It consists of the parts and the constructions and combinations of parts hereinafter described and claimed.

Figure 1:
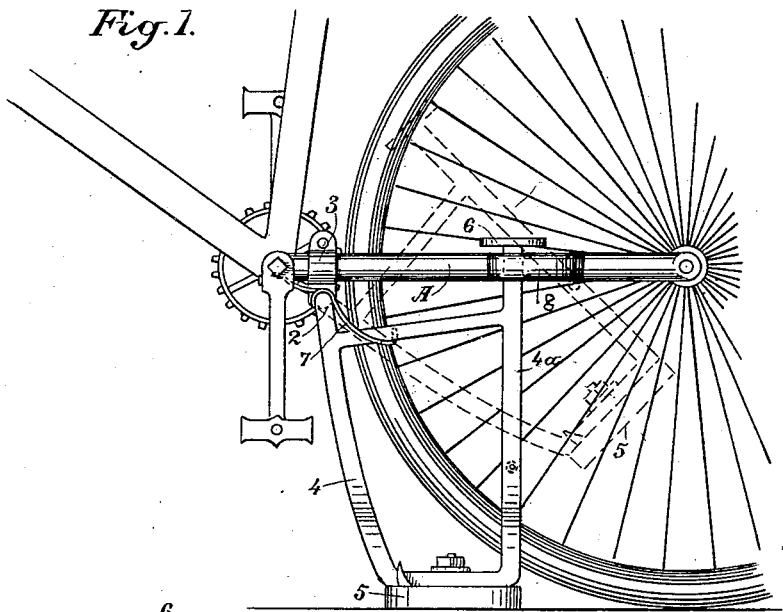
Figure 2:
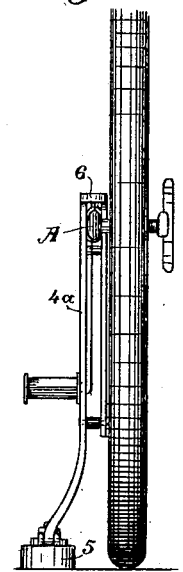
Figure 3:
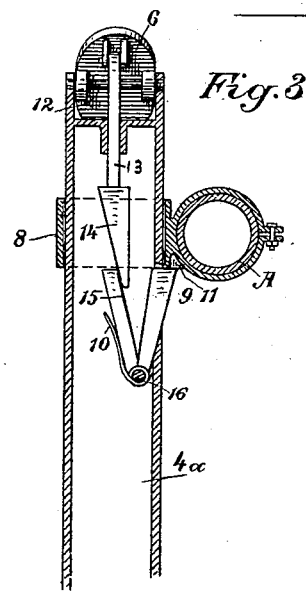
Figure 4:
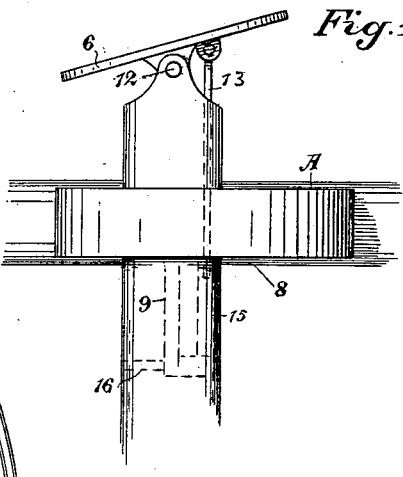
Figure 5:
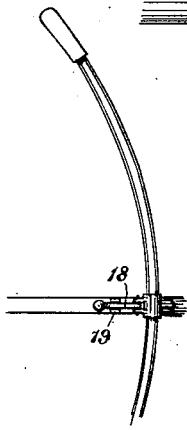

Figure 1 is a side elevation of the rear part of a bicycle, showing my brake attached to it. Fig. 2 is a rear end view of the same. Fig. 3 is a vertical section through the rear leg of the support. Fig. 4 is a side view of the same. Fig. 5 shows the manner of locking the handle-bar to the top bar of the frame.

This device may be attached to any convenient portion of a bicycle-frame, so as to be within reach of the foot of the operator.

As illustrated in the present drawings, A is the lower rear fork of the bicycle-frame upon the side opposite to the driving sprocket or gear.

2 is a horizontal pivot-pin fixed to the frame by a clamp 3 or in any other convenient manner, and this pin serves to support one angle of a frame 4, the bottom of which is of such shape as to carry the shoe 5. The opposite side of the frame extends upwardly to a point above the level of the frame-bar A and serves as or may carry a footpiece 6.

A spring 7, suitably attached, serves to raise this device, turning it about its pivot, as shown in dotted lines, so that normally the shoe 5 is out of contact with the ground and is preferably carried about as high from the ground as the lowest position of the pedals.

If it is desired to check the speed of the machine, the foot is removed from the pedal and placed upon the part 6, which is thus pressed down until the shoe 5 comes in contact with the ground with any desired force to either partially check or entirely stop the progress of the machine.

This device also serves as a support for the machine when it is desired to leave it. For this purpose the vertical arm $4^a$ may be made tubular and is slidable through a correspondingly-shaped guide 8, which is clamped upon the fork-bar A of the frame. This slidable bar $4^a$ has a spring-pressed lug 9 pivoted in a slot in one side and is normally pressed out by the spring 10, so that when it is pressed down in passing the clamp 8 it will be pressed in against the tension of the spring, and when it has passed below the clamp the spring forces it out, so that it will engage with a corresponding lug 11 on the clamp, and thus retain the bar in its depressed position and with the shoe resting upon the ground. In order to release this, the footpiece 6 is shown as being pivoted, as at 12, upon the top of the tube $4^a$, so that it may be tilted by the movement of the foot. A rod 13 is connected with this footpiece at one side or the other of the pivot 12 and upon its lower end carries a wedge-shaped piece 14, which is slidable within the tube whenever the footpiece 6 is tilted.

Connected with the pivot of the lug 9 is an arm 15, which extends out within the tube $4^a$ and against which the spring 10 presses, so as to normally force the lug 9 outside of the tube through the slot in which it moves. When the wedge 14 is depressed, it engages this arm 15 and pushes it back against the tension of the spring 10, thus turning the pivot-pin 16, to which it and the lug 9 are affixed, and the lug 9 is thus drawn in until it is out of line with the stop 11 on the guide-piece 8. The spring 7 then acts to raise the frame, as previously described. It will be understood that this tilting frame may be guided either by the clamp 8, as described, or it may be made with a slotted arm, which will clasp the side fork A, or in any other suitable manner for the purpose.

When used as a support for the machine, it is desirable to lock the front or steering wheel to prevent its turning out of line. This is effected by means of a lever 18, which is fulcrumed to the steering-head, so that it can be moved in a vertical plane. Upon the top bar of the frame are fixed lugs 19, with which this lever 18 can be made to engage when depressed, and thus prevent the wheel from turning. When the machine is in use, the lever 18 is disengaged from the lugs 19 and is then turnable in unison with the steering-head.

Having thus described my invention, what I claim as new, and desire to secure by Letters Patent, is—

1. The combination with a bicycle-frame of a pivoted turnable structure having a shoe adapted to contact with the ground, a footpiece turnable about the pivot-point of the structure to depress the shoe, and having an independent rocking movement, a spring-latch connected with and movable in unison with the rocking footpiece, a catch with which it engages after the shoe has been brought into contact with the ground, a releasing device and a returning-spring whereby the parts are caused to resume their normal position.

2. A structure pivoted to a bicycle-frame, a footpiece connected therewith, movable about the pivot-point, a shoe carried at the lower end of the structure and movable therewith so as to contact with the ground by pressure upon the footpiece, a latch engaging a fixed catch to retain the parts in position when the shoe rests upon the ground, and a disengaging device consisting of a tilting footpiece, a rod and wedge carried thereby adapted to disengage the latch and a spring by which the parts are returned to their normal position.

3. The combination with a bicycle-frame of a structure having one angle pivoted thereto, a shoe carried upon the lower portion, a rocking footpiece movable about the pivotal point by which the shoe may be forced into contact with the ground, a latch operated by the rocking movements of the footpiece by which said shoe is locked in this position, and means whereby the front wheel is prevented from turning while the machine is supported by the footpiece.

In witness whereof I have hereunto set my hand.

JOSEPH SCHULTE, Jr.

Witnesses:
S. H. NOURSE,
JESSIE C. BRODIE.